United States Patent [19]

Ananian

[11] Patent Number: 4,907,090
[45] Date of Patent: Mar. 6, 1990

[54] PROJECTION TELEVISION SCREEN PROTECTOR

[76] Inventor: Fredrick Ananian, 19252 Echo Pass, Trabuco Canyon, Calif. 92679

[21] Appl. No.: 257,437

[22] Filed: Oct. 13, 1988

Related U.S. Application Data

[63] Continuation-in-part of Ser. No. 231,434, Aug. 12, 1988.

[51] Int. Cl.⁴ ............................................. H04N 5/65
[52] U.S. Cl. .................................. 358/247; 358/245; 358/252; 358/253
[58] Field of Search ............... 358/231, 237, 252, 253, 358/254, 255, 245, 247, 248

[56] References Cited

U.S. PATENT DOCUMENTS

| | | | |
|---|---|---|---|
| 3,418,426 | 12/1986 | Schlegel et al. | 358/245 |
| 4,045,818 | 8/1977 | Wilhelm | 358/245 |
| 4,177,484 | 12/1979 | Boje | 358/237 |
| 4,246,613 | 1/1981 | Choder et al. | 358/245 |
| 4,427,264 | 1/1984 | Kamerling | 358/252 |
| 4,504,867 | 3/1985 | Keller | 358/245 |
| 4,628,365 | 12/1986 | Carlton | 358/245 |
| 4,652,085 | 3/1987 | Selling et al. | 358/247 |
| 4,788,597 | 11/1988 | Gart et al. | 358/247 |
| 4,819,085 | 4/1989 | Liang | 358/247 |

FOREIGN PATENT DOCUMENTS 0090722  8/1978  Japan.

*Primary Examiner*—James J. Groody
*Assistant Examiner*—Kim Yen Vu
*Attorney, Agent, or Firm*—Stetina and Brunda

[57] ABSTRACT

A transparent planar element sized to extend over a projection television screen to prevent accidental contact with the screen is disclosed. The planar element is preferably formed of a clear or tinted acrylic compound and is sized to be affixed to the peripheral portion of the screen housing by plural releasable fasteners. The peripheral portion of the planar element is additionally provided with an opaque border which visually conceals the releasable fasteners during use.

7 Claims, 1 Drawing Sheet

PROJECTION TELEVISION SCREEN PROTECTOR

RELATED APPLICATIONS

The subject application is a continuation-in-part patent application of pending U.S. patent application Ser. No. 231,434, filed Aug. 12, 1988, entitled PROJECTION TELEVISION SCREEN PROTECTOR.

FIELD OF THE INVENTION

The present invention relates generally to protective devices and more particularly to a protective device sized to extend over a projection television screen to prevent accidental contact with the screen.

BACKGROUND OF THE PRESENT INVENTION

As is well known, in recent years there has been a substantial increase in consumer demand for high technology video/audio equipment. With specific reference to televisions, industry priorities have moved toward larger screen sizes with 30- to 60-inch diagonal screen sizes currently existing in the marketplace. Basically these increased screen-sized televisions, generally known as "big screen televisions", comprise video receivers and projection systems which project a received video image upon a large projection screen. Although such video projection can either be facilitated from the front or rear of the projection screen, due to aesthetics and space considerations, most big screen televisions comprise rear projection systems. In either case, however, the video image is projected onto an enlarged screen which due to its construction is substantially fragile in nature and thereby prone to damage caused by inadvertent impact or scratching from routine cleaning. Further, the costs involved in replacing a damaged projection screen on such big screen televisions is extremely high.

In addition to the propensity of such projection screens becoming damaged during use, they additionally are more subject to incident environmental light which detracts from their viewing clarity, especially when the incident light causes glare upon the projection screen.

As such there exists a substantial need in the art for an economical device that is mountable upon such big screen televisions to protect the projection screen from inadvertent damage as well as reduce incident light upon such projection screen by reflection of the light away from the projection screen.

SUMMARY OF THE PRESENT INVENTION

The present invention specifically addresses and alleviates the above-referenced deficiencies in the prior art by providing a transparent planar element sized to extend over the projection television screen to prevent accidental contact with the screen during use.

In the preferred embodiment, the planar element is preferably formed of a clear transparent or tinted transparent acrylic compound and is sized to be affixed to the peripheral portion of the screen housing or television frame by plural releasable fasteners.

Although differing fasteners are contemplated, in the preferred embodiment plural hook and loop fasteners are positioned about the peripheral portion of the planar element and upon corresponding locations of the screen housing such that the planar element may be removably mounted to the big screen television in a simple pressing motion.

Additionally in the preferred embodiment, the planar element includes an opaque border which visually conceals the releasable fasteners disposed thereon and additionally provides an aesthetic high technology appearance to the planar element which visually integrates the planar element with the housing and/or cabintry of the big screen television.

Due to the planar element extending completely over the projection screen, it forms a mechanical barrier which eliminates inadvertent impact to the projection screen. Further, the planar element provides a dust barrier to the big screen thereby reducing the requirement for dusting of the projection screen during use. In this regard, the planar element may be readily cleaned by use of a dampened soft cloth or suitable cleaning solution to remove any dust accumulating thereon during use. Further, the present invention acts as a video filter for the projection screen tending to diffuse the video image during passage therethrough.

DESCRIPTION OF THE DRAWINGS

These as well as other features of the present invention will become more apparent upon reference to the drawings wherein.

DETAILED DESCRIPTION OF THE PREFERRED EMBODIMENT

Referring to the figures, there is shown the improved projection television screen protector device of the present invention designated generally by the numeral 10. In the preferred embodiment, the screen projector 10 is formed from a generally transparent planar element 12 having a width of approximately one-eighth of an inch and a height and length dictated by the particular big screen television 30 desired for its applicational use. In the preferred embodiment, the planar element 12 is fabricated from a thermoplastic material, such as acrylic or plexiglass, and may additionally include a color tint disposed therein to provide a desired transparent coloring, such as smoke or amber, to reduce glare caused by incident environmental light upon the element 12. Those skilled in the art will recognize, however, that the planar element 12 can be formed from a variety of transparent or semi-transparent materials, such as glass, and be suitable for use in the present invention.

Figure 2:
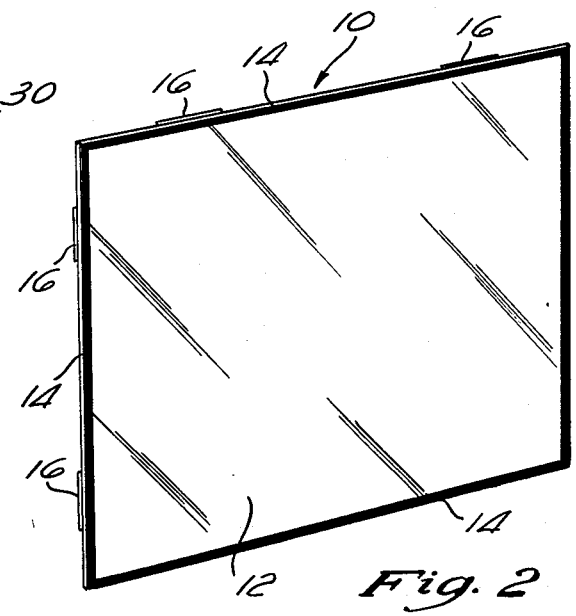
FIG. 2 is a front perspective view of the screen protector of the present invention.
Figure 3:
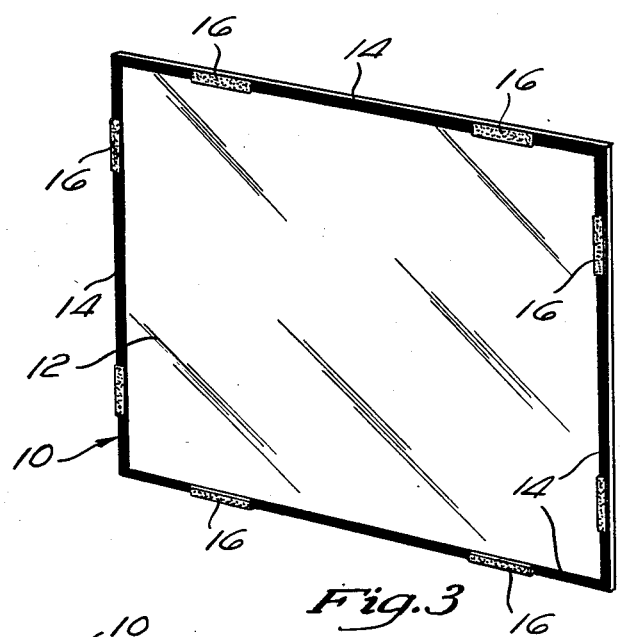
FIG. 3 is a rear perspective view of the screen protector of the present invention.
Figure 4:
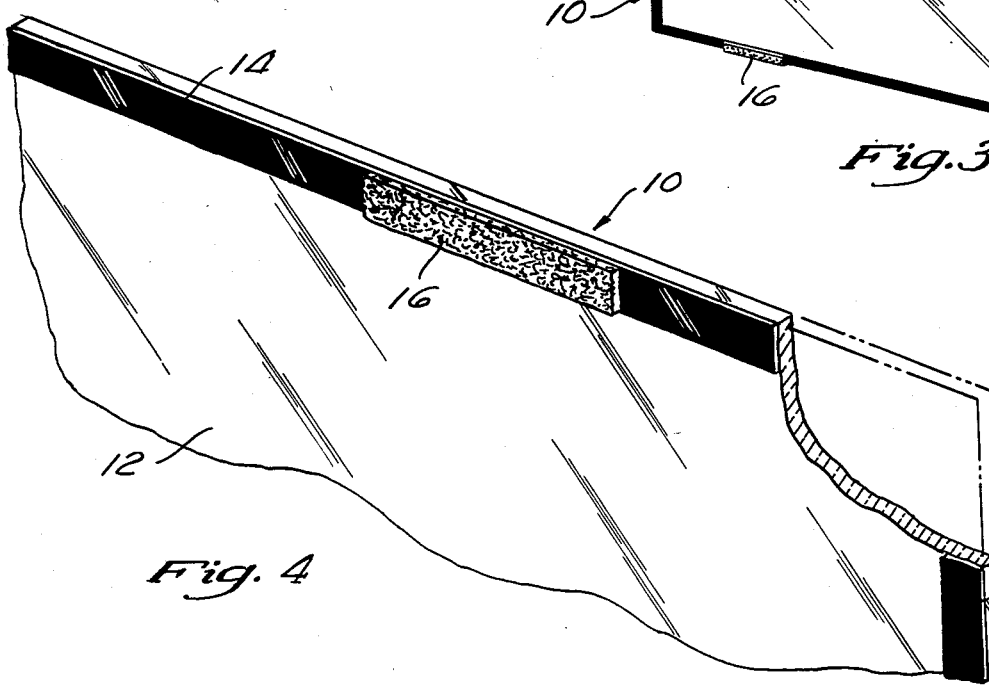
FIG. 4 is an enlarged partial perspective view of the rear surface of the screen protector of the present invention.

Referring more particularly to FIGS. 3 and 4, in the preferred embodiment the peripheral portion of the planar element 12 is provided with a border 14 formed on its rear surface which is preferably formed by an opaque coating, such as black paint. Although not by way of limitation, the border 14 preferably extends completely about the peripheral edges of the element 12 and is sized to have an effective width of approximately five-eighths of an inch. The opaque border serves to provide a high tech aesthetic appearance to the protector 10 when viewed from its front surface, as shown in FIGS. 1 and 2, and further serves to conceal plural releasable fasteners 16 positioned upon the rear surface of the planar element 12 utilized to affix the planar element 12 to the big screen television 30.

Figure 1:
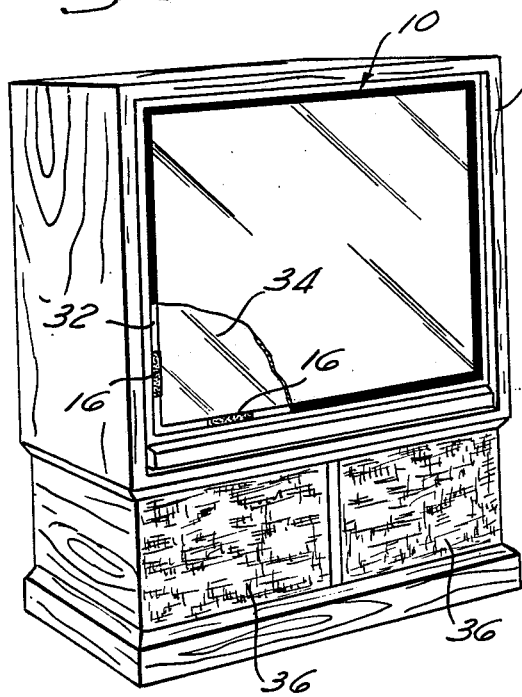
FIG. 1 is a perspective view of the screen protector of the present invention affixed to a big screen television.

Although various releasable fasteners are contemplated for use in the present invention, in the preferred embodiment the releasable fasteners 16 comprise plural elongate strips of mating hook and loop fasteners which are adhesively applied to the rear surface of the planar element 12 at locations upon the border 14, as illustrated in FIG. 4, and corresponding locations upon the housing or cabinet 32 of the big screen television 30, as indicated in FIG. 1.

Figure 5:
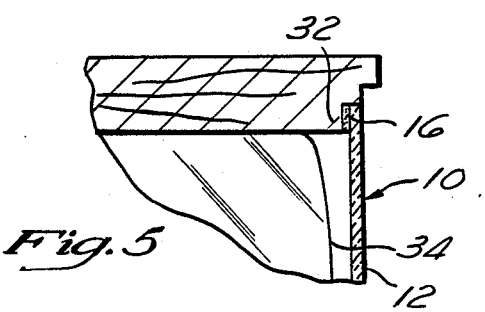
FIG. 5 is a cross-sectional view illustrating the position of the screen protector of the present invention when installed upon a big screen television.

With the structure defined, the installation and operation of the screen protector 10 of the present invention may be described with specific reference to FIGS. 1 and 5. For purposes of illustration and not by way of limitation, the particular big screen television 30, depicted in FIG. 1, comprises an NEC PJ-4170S big screen television/stereo receiver/monitor which includes a front projection screen 34, cabinet or housing 32, and audio speakers 36. As will be recognized, however, other manufacturers of such big screen televisions, such as Mitsubishi, are contemplated herein.

As is typical of all such big screen televisions 30, a cabinet, housing, or frame 32 is typically provided which extends about the perimeter portion of the projection screen 34. In the preferred embodiment, the overall dimensions of the protector 10 are sized to be commensurate with the peripheral housing, cabinet, or frame 32 such that the protector 10 extends completely thereover. To install the screen protector 10, one portion, i.e. the hook portion of the hook and loop fasteners 16, may be adhesively applied by self-adhesive positioned on the back portion thereof to the inside or back surface of the planar element 12 at desired locations, as depicted in FIG. 4. Subsequently corresponding portions of such fasteners 16, i.e. the loop portion, may be applied to corresponding locations of the housing frame 32, as indicated in FIG. 1. Subsequently, the planar element may be positioned relative the housing or cabinet frame 32 and be pressed inwardly thereupon whereby the hook and loop fasteners 16 engage and mount the protector 10 upon the television 30, as depicted in FIGS. 1 and 5. With the projector 10 installed upon the television set 30, it will be recognized that the protector 10 provides a physical barrier over the entire projection screen 34 which prevents accidental impact or contact with the projection screen 34. Further, due to the mounting of the protector 10 upon the housing or cabinet frame 32, when installed upon the television set 30, the projector is visually integrated therewith to maintain the overall aesthetics of the television 30. Finally, when the projector 10 is formed to possess a color tint, environmental glare caused from incident light within the operational environment of the television 30 is substantially reduced.

Although for purposes of illustration certain material and sizes have been defined herein, those skilled in the art will recognize that various modifications to the same can be accomplished without departing from the spirit of the present invention and such modifications are clearly contemplated herein.

What is claimed is:

1. A screen protector for protecting the typically fragile screen of a big screen television comprising:
    a planar element formed of a substantially transparent material sized to extend over a projection screen of a big screen television;
    means positioned upon said planar element for releasably mounting said planar element in an overlying orientation with the projection screen of the big screen television; and
    an opaque border for concealing said mounting means extending about the peripheral edges of said planar element.

2. The screen protector of claim 1 wherein said releasable mounting means comprises at least one hook and loop fastener.

3. The screen protector of claim 2 wherein said opaque border comprises a paint border applied to a portion of one side of said planar element.

4. The screen protector of claim 3 wherein said planar element is formed from a plastic material.

5. The screen protector of claim 4 wherein said plastic material comprises an acrylic plastic material.

6. The screen protector of claim 3 wherein said plastic material is color tinted.

7. The screen protector of claim 3 wherein said planar element is sized to extend over the peripheral housing of the projection screen of the big screen television.

* * * * *